United States Patent [19]
Kulka

[11] 3,861,356
[45] Jan. 21, 1975

[54] ANIMAL SHELTER

[76] Inventor: Helen C. Kulka, 200 Film Bldg., Cleveland, Ohio 44114

[22] Filed: Mar. 8, 1973

[21] Appl. No.: 339,372

[52] U.S. Cl. .................................................. 119/19
[51] Int. Cl. .............................................. A01k 1/02
[58] Field of Search ........................ 119/19, 16, 15

[56]  References Cited
UNITED STATES PATENTS

| | | | |
|---|---|---|---|
| 1,879,473 | 9/1932 | Pitts | 119/19 |
| 2,775,222 | 12/1956 | Kruck | 119/19 X |
| 2,795,208 | 6/1957 | Rasmussen | 119/19 X |
| 3,084,667 | 4/1963 | Felhofer et al. | 119/19 |
| 3,308,789 | 3/1967 | Artig | 119/19 |

*Primary Examiner*—Hugh R. Chamblee
*Attorney, Agent, or Firm*—Donald D. Jeffery

[57]  ABSTRACT

Disclosed is an animal shelter suitable for protecting a pet from loud and/or sudden external noises. The shelter comprises preferably a dome-shaped housing having an integral plastic outer shell and contiguous therewith at least one sound absorbing layer and at least one sound barrier layer. The preferred wall structure for the shelter consists of the above mentioned outer shell, a layer of high density polyurethane foam, a layer of leaded vinyl sound barrier material, an air space, a thin layer of rubber, a layer of acoustic fiberglass, and finally a second sound barrier layer of leaded vinyl. Heat insulating members can be attached inside a dome-shaped shelter or the housing can be formed with flexible walls of sound and heat insulating materials.

10 Claims, 5 Drawing Figures

PATENTED JAN 21 1975
3,861,356
SHEET 1 OF 2
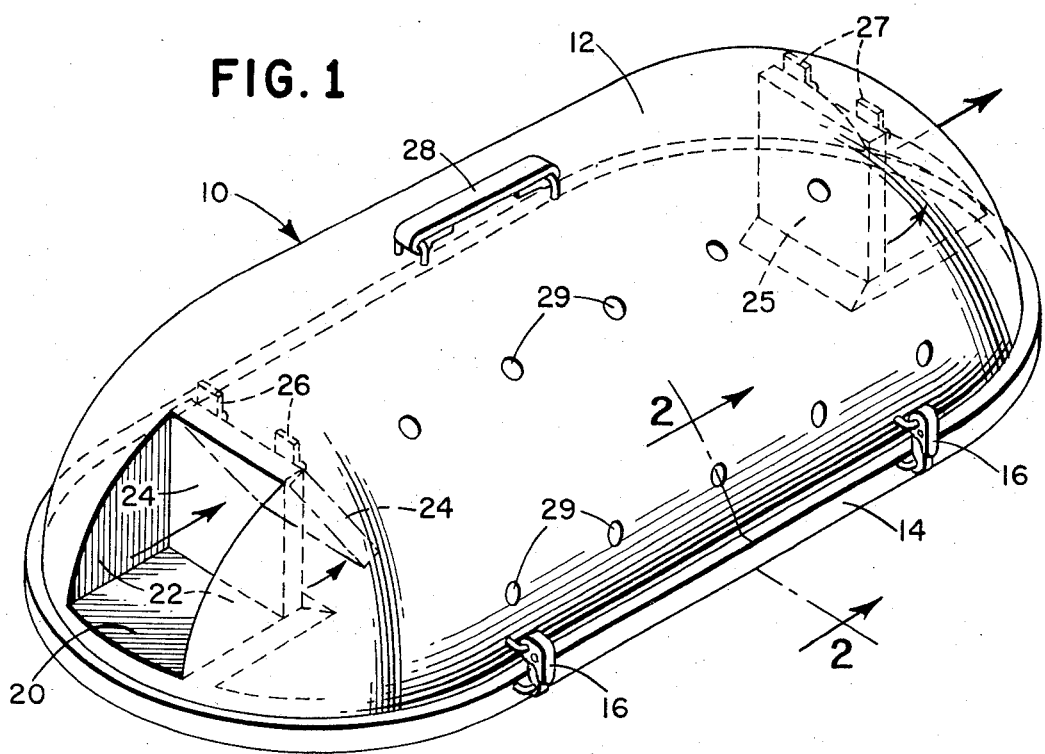
FIG. 1
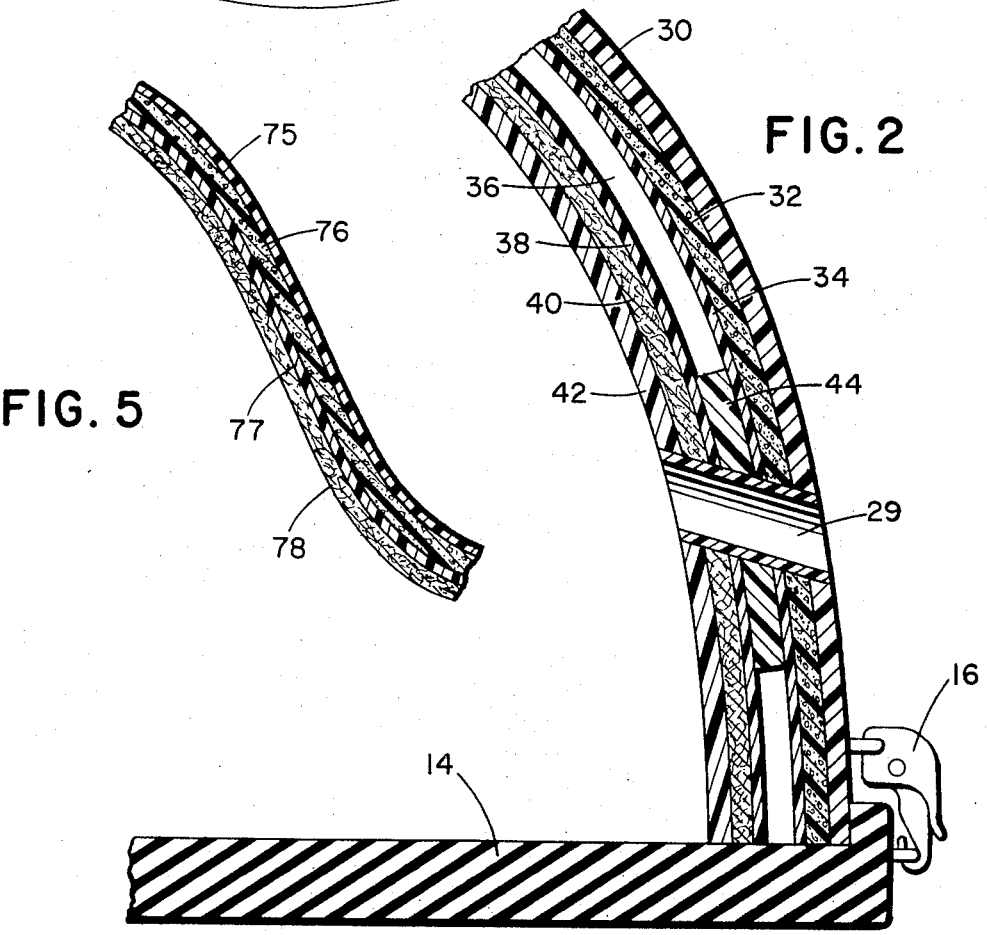
FIG. 2
FIG. 5

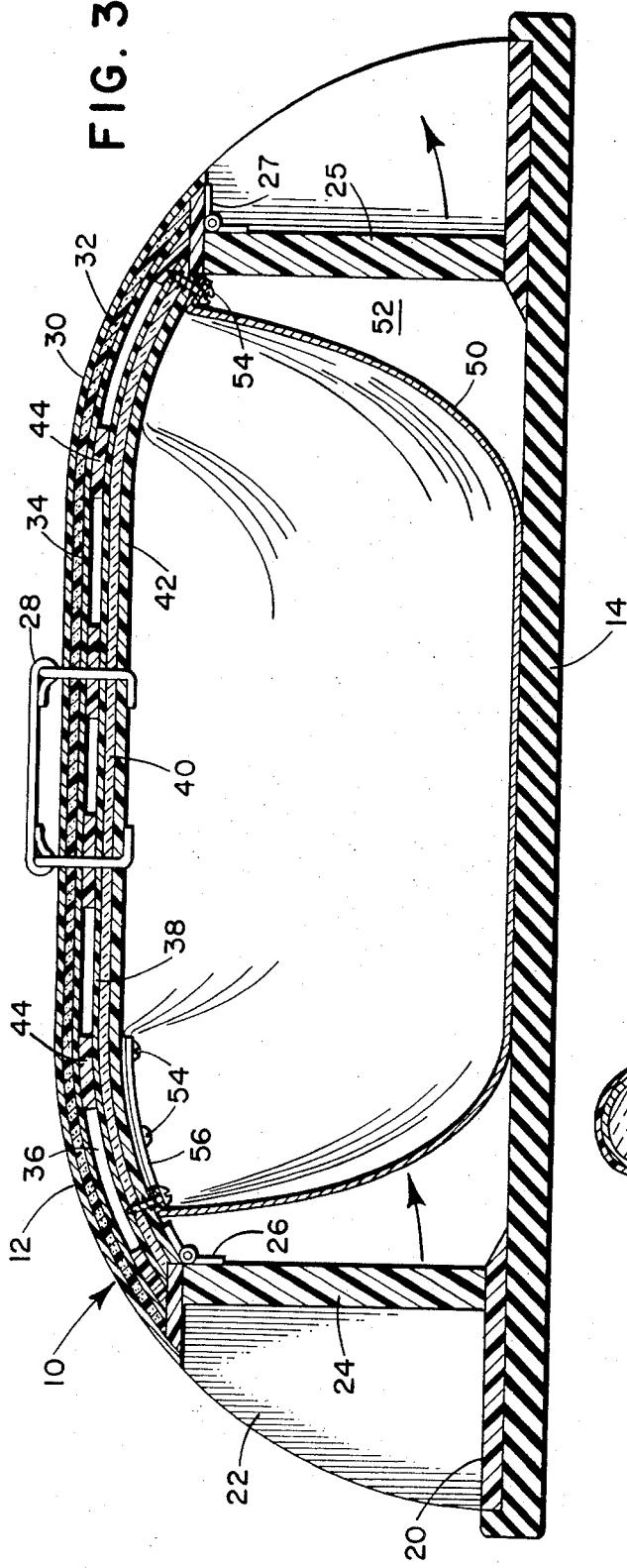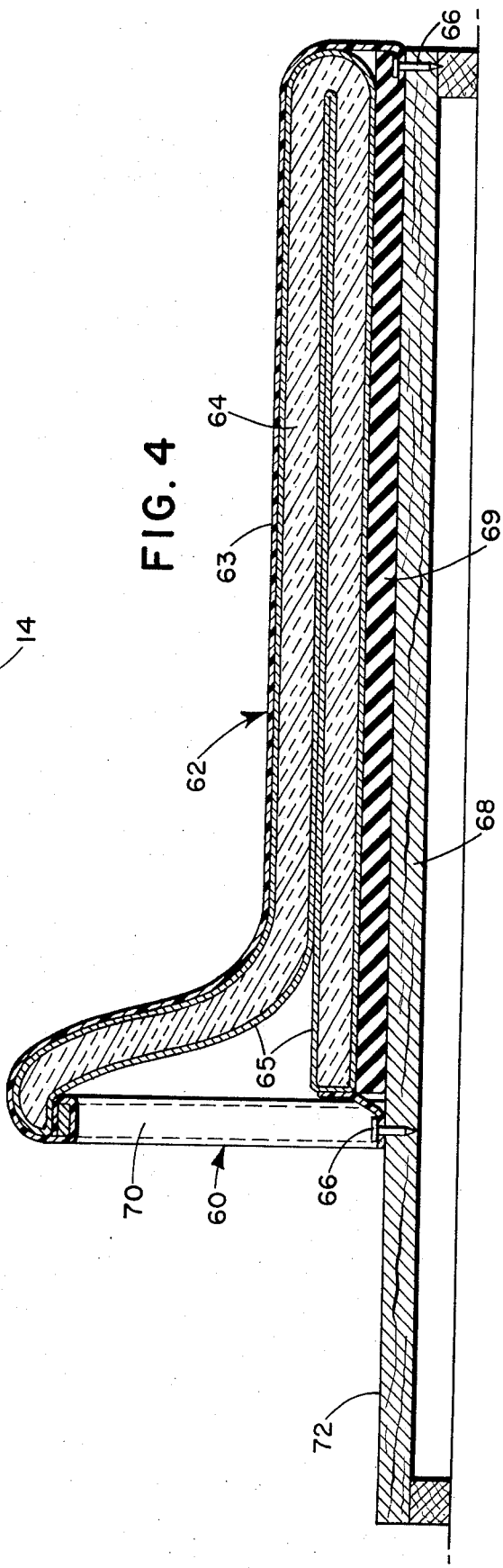

ANIMAL SHELTER

BACKGROUND OF THE INVENTION

The present invention relates to an animal shelter and more especially to an animal shelter which is suitable for protecting a domestic pet such as a dog from loud and/or sudden external noises such as percussion noises or explosions.

A great many common household pets, and particularly many breeds of dogs, are extremely sensitive to any loud or sudden noises which occur in the animal's environment. The noises from which the animal shelter according to the present invention is designed to protect a pet may arise from any number of sources, and this number is constantly growing in our modern technologically oriented society wherein the problem of noise pollution becomes ever more serious each year. For example, noises which arise from outside the home include noises from vehicular traffic, construction work and the like, whereas noises arising within the home may range from any of today's noise-generating applicances to the slamming of doors and even to noisy children. Other special circumstances can also be envisioned where the animal shelter according to the present invention would find utility such as, for example, a hunting or other environment wherein the sound of gunfire must be tolerated, or the especially sensitive profession where highly bred dogs are shown and otherwise placed in competition.

SUMMARY OF THE INVENTION

It is therefore an object of the present invention to provide an animal shelter which can be used to suitably house a variety of domestic pets and at the same time provide protection for these pets from loud and/or startling noises which occur in the pet's environment.

Another object of the present invention resides in providing an animal shelter which is of extremely simple construction and is formed of lightweight materials.

It is yet another object of the present invention to provide an animal shelter, particularly for dogs, wherein the shelter can be employed either as a stationary fixture or an easily portable device.

Still another object of the present invention is to provide an animal shelter which combines the effects of both sound and heat insulation.

In accomplishing the foregoing objects, there has been provided according to the present invention an animal shelter suitable for protecting the occupant from loud and/or sudden external noises which comprised a housing member having an integral outside surface layer, and contiguous to this outside surface layer, at least one sound absorbing layer and at least one sound barrier layer. The housing member is preferably dome-shaped and removably attached to a solid base member of rubber or the like, and the housing member preferably contains one or more entrance and-/or exit doors which are of the same cross-sectional construction as the housing walls. In the preferred structure of the dome-shaped housing member, the cross-sectional configuration of the wall comprises a rigid outer molded plastic shell layer, an adjacent layer of foamed synthetic resinous material, a next layer of leaded vinyl, an enclosed air space separating this layer of leaded vinyl from a next layer of a thermoplastic material, a layer of acoustic fiberglass, and finally as the inside layer, a second layer of leaded vinyl. In addition, a flexible heat insulating member, such as a blanket, can be secured to the inside surface of the housing.

In an alternative embodiment, the housing can be formed of a flexible, non-rigid material and in the form of a bag or pouch having at least one opening. In this case, the sound barrier and/or sound absorbing material may be added to a heat insulating substance.

Other objects, features and advantages of the present invention will become apparent from the detailed description of the invention which follows when taken together with the drawings wherein:

FIG. 1 is a perspective view of a preferred animal shelter according to the present invention illustrating the structure and operation of the entrance and exit doors in phantom lines;

FIG. 2 is a cross-sectional view of the wall structure taken along the line 2—2 in FIG. 1;

FIG. 3 is a vertical longitudinal sectional view of the shelter in FIG. 1 additionally having a heat insulating member secured inside;

FIG. 4 is a vertical longitudinal sectional view of an animal shelter according to an alternative embodiment of the present invention; and FIG. 5 is a cross-sectional view of a flexible housing wall suitable for fabricating the shelter illustrated in FIG. 4.

DETAILED DESCRIPTION OF THE INVENTION

Referring now to the drawings, in FIG. 1 is illustrated an animal shelter designated generally by reference numeral 10, consisting of a generally dome-shaped housing member 12 resting upon a solid base member 14 constructed of, for example, hard molded rubber and being removably attached to the housing member by means of a pair of spring biased clips 16 on each side of the shelter. At one end of the oval shaped housing member is located a threshold area defined by floor area 20 and parallel side walls 22, which form a passageway communicating with the inside of dome-shaped housing member 12. A door 24 hingedly connected to the upper portion of the housing member by means of hinges 26 in its normally closed position completely covers this passageway. Door 24 is arranged so as to only rotate inwardly as is shown by the dashed lines in FIG. 1, and is constructed of the same material as the housing member. At the opposite end of the housing member 12 is located a second identical passageway which is covered by door 25 in its normally closed position. Door 25 is hingedly connected to the upper portion of housing member 12 by means of hinges 27, and is designed so as to rotate only in an outward direction as shown by the arrow in FIG. 1. The dome-shaped housing member 12 has a handle 28 attached to its top surface to render the animal shelter portable, and is further characterized by a plurality of ventilation holes 29 which pass through the wall of the housing member.

In FIG. 2 is illustrated the cross-sectional configuration of the wall of the housing member in the preferred embodiment according to the present invention wherein a dome-shaped housing like that illustrated in FIG. 1 is employed. Whereas in the present invention in its broadest sense the configuration of the wall cross-section may consist of only three layers, i.e., a solid outer layer, a layer of sound absorbing material and a third layer of a sound barrier material, the preferred embodiment consists of a structure comprising a solid integral outer layer 30 of plastic material or the like having immediately adjacent thereto a layer of foamed sound absorbing material 32. Immediately adjacent the foamed layer 32 is a layer of leaded vinyl material 34 which acts as a sound barrier. Positioned next in the laminated structure is an air space 36 which separates the first, outer three layers of the laminated structure from a second group of three layers on the inner portion of the wall cross-section. These latter three layers consist of a thin layer of thermoplastic material 38 immediately adjacent the air space, a layer of acoustical fiberglass 40 serving as a second sound absorbing layer, and an inside layer of leaded vinyl material 42 serving as a second sound barrier layer. The air space 36 is maintained between the two laminated sections by means of a series of spacers 44 which are positioned between leaded vinyl layer 34 and thermoplastic layer 38. The ventilation apertures 29 are conveniently positioned so as to occur at points on the housing member where the spacing means 44 are present.

In the preferred embodiment, the materials utilized to fabricate the laminated housing wall consist of a fairly rigid plastic material for the outer molded shell 30, e.g., polyethylene, polypropylene, ABS, and the like. The foamed sound absorbing layer 32 is preferably constructed from a foamed synthetic resin material such as a foamed polystyrene or, preferably, high density polyurethane. As previously mentioned, the sound barrier layers 34 and 42 are preferably constructed of a material known as leaded vinyl which comprises a sheet of vinyl plastic material which has been impregnated and/or coated with lead. These materials are available commercially. The acoustic fiberglass utilized to form the second sound absorbing layer 40 is likewise a commercially available product, and the thin layer of thermoplastic material utilized to separate the layer of acoustic fiberglass from the air space 36 is preferably formed of a thermoplastic resinous material such as rubber or the like. Spacers 44 may be constructed from any suitable solid material such as wood and natural or synthetic resinous materials.

Several of the layer combination illustrated in the cross-sectional view of FIG. 2 can be purchased commercially as a pre-laminated product. For example, foamed layer 32 and leaded vinyl layer 34 may be purchased as a single pre-laminated sheet under the trade designation "Eckoustic Curtain Sound Barrier"to from Clemco Products Company, Cleveland, Ohio. A similar product is sold under the trade designation "Hush Cloth II"to by American Acoustical Products, Division Ward Process, Incoporated, Natick, Md. The combination of acoustic fiberglass layer 40 and leaded vinyl layer 42 may also be purchased commerically from these same suppliers.

A further modification of the above-described embodiment of the invention is illustrated in FIG. 3 of the drawings wherein the rigid dome-shaped animal shelter is once again designated generally by reference numeral 10 and is fabricated principally from a dome-shaped housing member 12 and a solid base member 14. The modification involves securing a flexible heat insulating member such as wool blanket 50 to the inside surface of housing member 12 so that it envelops the internal cavity 52 defined by the exterior walls of the shelter. Blanket 50 is secured to the upper portion of the inner wall by means of a plurality of screws 54 passing through appropriately located plates 56 beneath which blanket 50 is held.

An alternative embodiment of the present invention is illustrated in FIG. 4 of the drawings. Referring to this figure, there is designated generally by reference numeral 60 an animal shelter which is fully in accordance with the principles of the present invention although it is not fabricated in the form of a rigidly defined structure. Instead, shelter 60 consists of a flexible bag-shaped housing 62 resting upon and secured to a base member 68. The bag member 62 is itself formed from a pliable, weather resistant layer 63 of vinyl material as its outside layer, an intermediate layer 64 of sound and heat insulating material such as a natural or synthetic fibrous product, e.g., dacron, wool, etc., and an inside layer 65 of fabric, leaded vinyl or the like which serves both to confine the intermediate layer 64 and also as a sound barrier layer. Bag 62 is secured at its extremities, by means of nails 66, to base member 68 which is constructed preferably of wood. To permit entrance of a pet, the open end of bag 62 is held permanently open by means of an upstanding frame 70 which is also secured to base 68. An extending portion 72 of base 68 is provided in front of the bag opening for the purpose of stabilizing the entire bag when a pet is in the process of entering or leaving the shelter. An intermediate layer 69 of cushioning and/or insulating material may also be provided between base 68 and the bottom wall of bag 62.

In FIG. 5 is illustrated another possible configuration for the wall structure of flexible bag member 62. The wall is constructed of outer layer 75 of flexible, weather resistant material such as vinyl, an adjacent intermediate flexible layer 76 of foamed sound and heat insulating material such as a foamed synthetic resinous material, a second intermediate layer 77 of a leaded vinyl sound barrier material and finally, an inside layer 78 of a soft, heat insulating material such as wool which a pet will find desirable as its immediate bedding layer. As in the embodiment illustrated in FIG. 1, intermediate layers 76 and 77 may be constructed from a single preformed laminate of leaded vinyl and foamed synthetic resin available commercially.

While the present invention has been described with reference to several preferred embodiments thereof, it is apparent that other embodiments utilizing the inventive concepts of the present invention will be readily preceivable by those of ordinary skill in the art. For example, it would be possible to construct the dome-shaped housing member illustrated in FIG. 1 in two telescoping sections so that the animal shelter could be readily adjusted in size. Similarly, a construction could be envisaged wherein a single sheet of laminated material constructed in accordance with the principals of the present invention is shaped such that upon rolling, bending or forming, for example simply into a cylindrical shape, with the attachment of one or more door-containing end members, an extremely portable animal shelter fully in accordance with the principals and teachings of the present invention could be easily constructed. Accordingly, it is to be understood that the coverage afforded the instant invention is not to be limited except by the claims appended hereto.

What is claimed is:

1. An animal shelter suitable for protecting the occupant from loud and/or sudden external noises, comprising a housing member in the form of a generally dome-shaped rigid structure having a solid integral outside surface layer, a layer of foamed material adjacent thereto, and an inside surface layer comprising an inner layer of a sound barrier material and a layer of acoustic fiberglass material adjacent thereto.

2. An animal shelter according to claim 1, wherein said housing member further comprises a second layer of a sound barrier material adjacent said layer of foamed material and a layer of synthetic resinous material adjacent said acoustic fiberglass layer, said second sound barrier layer and said synthetic resinous layer being contiguous to one another and being separated by an air space therebetween.

3. An animal shelter according to claim 2, wherein said two layers of sound barrier material are formed of leaded vinyl.

4. An animal shelter according to claim 1, wherein said foamed material is a natural or synthetic resin.

5. An animal shelter according to claim 4, wherein said thermoplastic synthetic resin is high density polyurethane.

6. An animal shelter according to claim 1, wherein said solid integral outside layer of the housing member comprises a molded plastic shell.

7. An animal shelter according to claim 6, further comprising a flexible heat insulating member secured to the inner surface of said housing member.

8. An animal shelter suitable for protecting the occupant from loud and/or sudden external noises, comprising a housing having a solid integral outside surface layer having weather resistant characteristics, at least one sound absorbing layer and at least one sound barrier layer positioned contiguous to said outside surface layer, and a pair of doors mounted at opposite ends of said housing, and hinge means for mounting said door means for swinging movement inwardly and outwardly respectively of said housing for entrance to and exit from said housing.

9. An animal shelter according to claim 8, further comprising a solid base member for said shaleter, and means to fixedly attach said base member to said housing member.

10. An animal shelter according to claim 8, wherein said housing member is generally dome-shaped, and further comprising handle means secured to the top of said housing member to facilitate carrying the shelter.

* * * * *